Dec. 19, 1950 R. W. JENNY 2,534,517
OVERRUNNING ROTARY FLUID COUPLING DEVICE
Filed Aug. 31, 1945
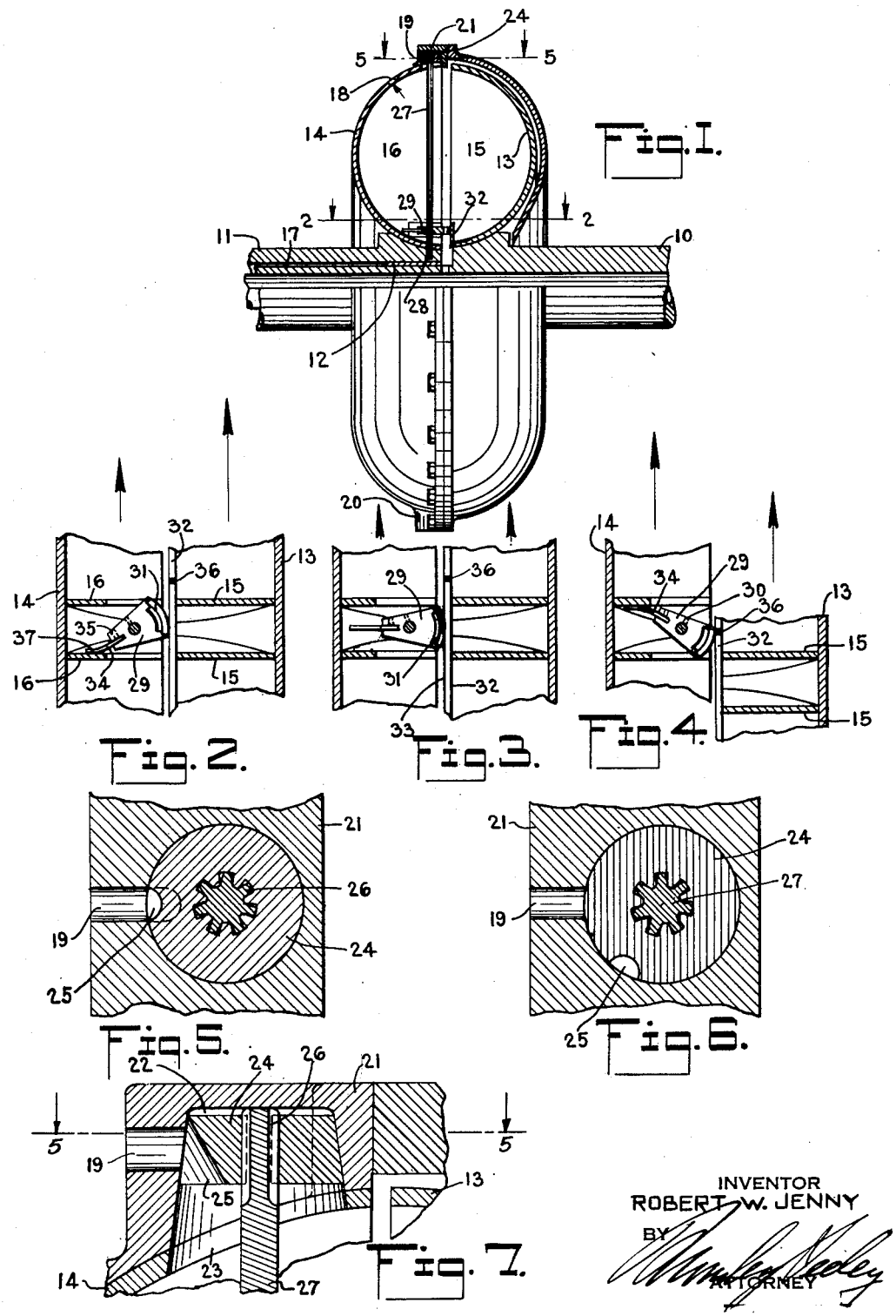
INVENTOR
ROBERT W. JENNY

Patented Dec. 19, 1950

2,534,517

UNITED STATES PATENT OFFICE 2,534,517

OVERRUNNING ROTARY FLUID COUPLING DEVICE

Robert W. Jenny, East Paterson, N. J., assignor to Curtiss-Wright Corporation, Bloomfield, N. J., a corporation of Delaware Application August 31, 1945, Serial No. 613,738

2 Claims. (Cl. 60—54)

The invention relates to a power transmission or torque converter which includes a fluid coupling drive of the type where an impeller or driving member forces an actuating fluid against the vanes of a runner or driven member to rotate the same and which transmission is herein sometimes hereinafter referred to as a hydraulic transmission of the kinetic type.

It sometimes happens in transmissions of this character that under some conditions the member which normally is the driven member becomes a driving member with a tendency to cause the transmission of torque to flow in a reverse or opposite direction. This is objectionable among other reasons because it imposes a load on the driven member in a direction which it is not intended or designed to turn.

The primary object of the invention is to provide a simplified form of fluid coupling drive which will provide overrunning characteristics in the runner and at the same time which will avoid transmission of torque therethrough in the reverse direction.

Briefly the invention features a bleeding release for the driving fluid used with such devices and which release will become operable automatically as soon as the driven member begins to overrun the driving member. Such relative reverse movement controls a release valve arranged to permit the flow to escape through the coupling at a rate faster than it is taken into the coupling and at the same time to permit the driven member to rotate freely and even to overrun the driving member when the driving and driven members are in their normal driving relation.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing:

Fig. 1 is a view of a fluid coupling with a preferred embodiment of the invention installed therein and with the upper portion shown in axial section;

Fig. 2 is a detailed and enlarged view taken on the line 2—2 of Fig. 1 looking downwardly as indicated by the arrow, with the valve controlling parts in their normal relation and with the impeller overrunning the runner with the usual slip;

Fig. 3 is a similar view with the parts in the position assumed when the runner and impeller are at the same speed;

Fig. 4 is a view similar to that of Figs. 2 and 3 with the parts in the position assumed when the runner overruns the impeller;

Fig. 5 is an enlarged transverse section of the valve taken on the line 5—5 of Fig. 1 and taken on the line 5—5 of Fig. 7 and showing the valve open by the Fig. 4 setting of its controlling parts;

Fig. 6 is a view similar to that of Fig. 5 showing the valve closed by the Fig. 2 setting of its controlling parts, and Fig. 7 is an enlarged showing of the valve at the top of Fig. 1 with the valve in open position as indicated in Fig. 5.

In the drawing there is shown a driving shaft 10 in axial alignment with a driven shaft 11 and with an end of the driving shaft intruded into an end of the driven shaft with a spacer 12. The driving shaft is provided with a driving element or impeller 13 and the driven shaft is provided with a driven element or runner 14. The runner and impeller are equipped respectively with vanes 15 and 16. The impeller and runner are of the usual disk-shape shell construction disposed in juxtaposition to form a substantially closed toroidal liquid containing space or hydraulic working circuit therebetween. Oil or other actuated liquid is supplied under pressure to the coupling through an intake passageway 17 formed between the telescoped ends of the driving and driven shafts. The runner is provided adjacent its outer periphery with one or more normally open bleeding vents 18 through which the liquid is discharged as an instance of the centrifugal force developed by the rotating runner during the normal running of the coupling. It is understood that the structure as thus far described is of conventional design and is simply illustrative of one form of fluid coupling to which the inventive features of this disclosure may be applied.

The distinctive feature of this disclosure is that the runner 14 is provided with one or more supplementary valve controlled discharge ports at its perimeter and which parts are capable when open of quickly emptying the fluid conduit formed between the impeller and runner. One of the ports 19 is shown at the top of Fig. 1 and the other 20 is shown at the bottom of this figure. As they are alike except for obvious reversal in position, the description of one fits the other.

Each discharge port includes a valve casing 21 provided with a valve containing pocket 22 of frusto-conical form with its larger end opening into the interior of the runner through a large outlet 23 found in the runner shell. The outlet port 19 or 20 is controlled by and normally closed by a valve 24 fitted in the pocket as best shown in Fig. 7. The valve is provided with an angularly extending by-passing opening 25 located for placing the runner interior in discharging relation to the outlet port 19 or 20 when in the position shown in Figs. 5 and 7. The passageways provided by the opening 23 and 25 and ports 19 and 20 provide discharge conduits of large volumetric capacity to facilitate a quick release of the fluid pressure in the runner. The valve 24 is secured by means of splines 26 to the outer end of a valve shaft 27 so that the rotation of the valve shaft over a few degrees of turn about its own axis can move its associated valve to and from its open and closed positions.

The valve shafts 27 extend radially across the open end of the runner, have their inner ends mounted in journalling recesses of which one is shown at 28 in Fig. 1. The shaft is provided at the end adjacent its inner end with a plate 29 in the form of a segment secured to the shaft by a pin 30 and provided at its outer curved perimeter with a curved spring plate 31 having its opposite ends inserted into and secured by reason of its tension to the plate. The impeller is provided adjacent its inner portions with an annular baffle plate 32 disposed as illustrated. The plate 32 and segment 29 and its shaft 27 are so proportioned and related that the radius of the segment with its spring plate 31 distended, is equal to the distance between the axis of shaft 27 and the adjacent face 33 of the plate 32. A leaf spring 34 acts on the segment and is biased to cause the spring face of the segment to bear on the face 33 of the plate 32 in all relative positions of segment and plate. One end of the spring is secured to the rear end of the segment by pin 35 with its free or tail end 37 disposed to swing between a pair of the vanes 16 and is disposed when in engagement with either of the vanes to maintain the segment in bearing engagement with the face 33.

In operation and assuming that the parts are in their normal operative relation, the runner and impeller will be turning in the same direction as indicated in Fig. 2. Under these conditions the impeller is turning at a rate slightly greater than rate at which the runner is turning as indicated by the long and short length arrows in extension respectively of the impeller and runner in this figure. This means that under normal driving conditions there is the usual slight slip between the impeller and runner.

Under these conditions the valve is in its closed position as indicated in Fig. 6, and otherwise following conventional practice the actuating oil or other fluid is being pumped through the inlet 17 and is being discharged at substantially the same rate through the constantly open discharge ports 18.

Let it be assumed that for some reason the runner starts to overrun the impeller, that is when the runner is moving in the same direction but at a greater speed than the impeller as indicated by the relatively long and short length arrows in Fig. 4. Assuming a point 36 on the plate 32 for convenient reference, it will be seen by comparing Figs. 2, 3 and 4 that in effect the point 36 has moved downwardly on the sheet and the plate 32 in its engagement with the spring face of the segment has caused the segment to rotate about its axis from the position shown in Fig. 2 through the position shown in Fig. 3 at which instant of time the impeller and rotor are turning at the same speed and in the same direction as indicated by the arrows of equal length to the Fig. 4 position where the segment has entirely rotated clockwise into its new position. The shifting of the segment from the Fig. 2 to the Fig. 4 position rotates the shaft 27 clockwise and this has the effect of shifting the valve in a similar clockwise direction from the Fig. 6 to the Fig. 5 position. This has the effect of bringing the passageway 25 from the closed position shown in Fig. 6 to the open position shown in Fig. 5. As the members are still rotating the centrifugal action produced on the fluid in the system forces the same outwardly through the outlets 19 and 20 at a rate very much in excess of the rate at which this fluid is admitted to the system through the intake 17. It is quite obvious that with a rapid discharge of the actuating fluid the transmission of the driving force will be reduced and whatever load there may be on the runner will tend quickly to reduce its velocity; thus cause it to slow down and in this way permit the normal driving impeller to return to the condition shown in Fig. 2 with its speed of rotation greater than the speed of rotation of the runner. This in effect causes the point 36 to move upwardly of the sheet from the Fig. 6 position back into the Fig. 2 position, thus rerotating the shaft 27 and shifting the valve back into its normally closed position as shown in Fig. 6 and at this point the parts are restored to their normally operative driving position.

I claim:

1. In a fluid coupling, the combination of a driving member provided with an impeller element, and a driven member provided with a runner element, said runner element provided with an open bleeding port for discharging the actuating fluid from the same in the normal driving operation of the coupling and also provided with a discharge port of greater discharging capacity than the bleeding port for quickly emptying the runner under its centrifugal action, a valve for controlling the discharge port, a shaft for adjusting the valve relative to its associated port as the shaft is rotated, a baffle plate carried by the impeller and disposed in its plane of rotation and said shaft provided with a spring biased segment fixed thereto and normally having one curved edge engaging said plate, and said plate normally reacting on the segment to maintain the valve closed when the impeller and runner are turning in the same direction with the impeller tending to overrun the runner and said plate acting on the segment to open the valve when the runner and impeller are turning in the same direction with the runner tending to overrun the impeller.

2. A hydraulic coupling comprising a driving member, a member to be driven thereby, said members being formed to provide a chamber therebetween for the working fluid of said coupling, a liquid discharge port for said chamber, a valve carried by one of said members for controlling said port, and an element operatively connected to said valve and carried by said one member for rotation therewith and for pivotal movement about an axis radial relative to the coupling axis between a first position in which said element closes said valve and a second position in which said element opens said valve, said element being frictionally engaged with a flat annular surface on and co-axial with the other of said members so that overrun of said driving member relative to said driven member frictionally urges said element for pivotal movement about its pivot axis to its said first position and reverse relative rotation of said members frictionally urges said element for pivotal movement about its pivot axis to its said second position.

ROBERT W. JENNY.

REFERENCES CITED

The following references are of record in the file of this patent:

UNITED STATES PATENTS

| Number | Name | Date |
| --- | --- | --- |
| 1,866,424 | Schmieske | July 5, 1932 |
| 2,074,346 | Sinclair | Mar. 23, 1937 |
| 2,149,369 | Sinclair | Mar. 7, 1939 |
| 2,187,667 | Sinclair | Jan. 16, 1940 |